(12) United States Patent
Alexander

(10) Patent No.: US 10,679,131 B2
(45) Date of Patent: Jun. 9, 2020

(54) SYSTEM AND METHOD FOR EFFICIENT DATA COLLECTION IN DISTRIBUTED SENSOR MEASUREMENT SYSTEMS

(75) Inventor: Roger K. Alexander, Rockville, MD (US)

(73) Assignee: Eaton Intelligent Power Limited, Dublin (IE)

( * ) Notice: Subject to any disclaimer, the term of this patent is extended or adjusted under 35 U.S.C. 154(b) by 1528 days.

(21) Appl. No.: 13/547,420

(22) Filed: Jul. 12, 2012

(65) Prior Publication Data

US 2014/0019397 A1  Jan. 16, 2014

(51) Int. Cl.
| G06N 5/02 | (2006.01) |
| H04W 4/029 | (2018.01) |
| H04W 4/38 | (2018.01) |

(52) U.S. Cl.
CPC .............. *G06N 5/02* (2013.01); *H04W 4/029* (2018.02); *H04W 4/38* (2018.02)

(58) Field of Classification Search
CPC ........................................................ G06N 5/02
See application file for complete search history.

(56) References Cited

U.S. PATENT DOCUMENTS

| 3,344,420 A | 9/1967 | Arsove |
| 5,600,558 A | 2/1997 | Mearek et al. |
| 6,038,652 A | 3/2000 | Phillips et al. |
| 6,701,195 B2 | 3/2004 | Brown et al. |
| 6,748,303 B2 | 6/2004 | Hawthorne |
| 7,187,906 B2 | 3/2007 | Mason, Jr. et al. |
| 7,239,250 B2 | 7/2007 | Brian et al. |
| 7,301,476 B2 | 11/2007 | Shuey et al. |
| 7,417,577 B2 | 8/2008 | Testud et al. |

(Continued)

FOREIGN PATENT DOCUMENTS

| EP | 2375576 A1 | 10/2011 |
| WO | WO 2012/036633 A1 | 3/2012 |

OTHER PUBLICATIONS

PCT/US2013/048451, filed Jun. 28, 2013, Search Report and Written Opinion, dated Oct. 16, 2013, 9 pages.

(Continued)

*Primary Examiner* — Vincent Gonzales
*Assistant Examiner* — Kevin W Figueroa
(74) *Attorney, Agent, or Firm* — Patterson Thuente Pedersen, P.A.

(57) ABSTRACT

Endpoint device, central data collection point, and associated methods for collecting data over a communication network between endpoints and the central collection point. Actual measurements from a sensor are obtained by the endpoint device at a relatively fine time granularity. The endpoint device generates reports for receipt by a central data collection point. The reports include regular reports containing a portion of the actual measurements representing sensor measurements at a relatively coarse time granularity, and exception reports, containing information representing one or more of the actual measurements that differ in frequency or granularity of regular report measurements. Each of the exception reports is generated in response to a determination that at least one of the actual measurements differs from a predicted value for that at least one of the one or more actual measurements by an amount that exceeds a pre-established limit.

37 Claims, 12 Drawing Sheets

(56) References Cited

U.S. PATENT DOCUMENTS

| | | |
|---|---|---|
| 7,611,092 B2 | 11/2009 | Silansky et al. |
| 7,734,380 B2 | 6/2010 | Ransom et al. |
| 7,902,995 B2 | 3/2011 | Kim |
| 7,987,260 B2 | 7/2011 | Rogers et al. |
| 8,026,830 B2 | 9/2011 | Womble et al. |
| 8,223,783 B2 | 7/2012 | Shorty et al. |
| 2003/0079211 A1 | 4/2003 | Lueh |
| 2004/0078657 A1 | 4/2004 | Gross et al. |
| 2005/0162283 A1 | 7/2005 | Salazar Cardozo |
| 2005/0179561 A1 | 8/2005 | Osterloh et al. |
| 2006/0056368 A1 | 3/2006 | Ratiu et al. |
| 2006/0129484 A1 | 6/2006 | Hurwitz et al. |
| 2006/0217115 A1 | 9/2006 | Cassett et al. |
| 2006/0248092 A1 | 11/2006 | Keller et al. |
| 2007/0115922 A1 | 5/2007 | Schneider et al. |
| 2008/0068215 A1 | 3/2008 | Stuber et al. |
| 2008/0071501 A1 | 3/2008 | Herzog |
| 2008/0151826 A1 | 6/2008 | Shorty et al. |
| 2008/0158007 A1 | 7/2008 | Nagy et al. |
| 2008/0180275 A1 | 7/2008 | Whitaker et al. |
| 2008/0219210 A1 | 9/2008 | Shuey et al. |
| 2008/0243439 A1 | 10/2008 | Runkle et al. |
| 2008/0250301 A1 | 10/2008 | Mukhopadhyay et al. |
| 2008/0295096 A1* | 11/2008 | Beaty ............... G06F 9/4856 718/1 |
| 2009/0058639 A1 | 3/2009 | Tanaka et al. |
| 2009/0109056 A1 | 4/2009 | Tamarkin et al. |
| 2009/0135018 A1 | 5/2009 | Veillette et al. |
| 2009/0135753 A1 | 5/2009 | Veillette |
| 2009/0135836 A1 | 5/2009 | Veillette |
| 2009/0135843 A1 | 5/2009 | Veillette |
| 2009/0138617 A1 | 5/2009 | Veillette |
| 2009/0138713 A1 | 5/2009 | Veillette |
| 2009/0167558 A1 | 7/2009 | Borleske et al. |
| 2009/0312006 A1 | 12/2009 | Montes et al. |
| 2010/0007521 A1 | 1/2010 | Cornwall |
| 2010/0131445 A1 | 5/2010 | Wu et al. |
| 2010/0152910 A1 | 6/2010 | Taft |
| 2010/0176967 A1 | 7/2010 | Cumeralto et al. |
| 2010/0180694 A1 | 7/2010 | Ely, III |
| 2010/0207784 A1 | 8/2010 | Bragg et al. |
| 2011/0009111 A1 | 1/2011 | Jung et al. |
| 2011/0066297 A1 | 3/2011 | Saberi et al. |
| 2011/0082596 A1 | 4/2011 | Meagher et al. |
| 2011/0109479 A1 | 5/2011 | Teffer et al. |
| 2011/0131342 A1 | 6/2011 | Pace et al. |
| 2011/0231320 A1* | 9/2011 | Irving ............... G06Q 30/00 705/80 |
| 2011/0251933 A1* | 10/2011 | Egnor et al. ............... 705/30 |
| 2011/0255548 A1 | 10/2011 | Johnson |
| 2012/0029710 A1* | 2/2012 | Dodderi et al. ............... 700/286 |
| 2014/0019397 A1 | 1/2014 | Alexander |
| 2014/0097966 A1 | 4/2014 | Alexander |

OTHER PUBLICATIONS

PCT/US2013/062819, filed Oct. 1, 2013, Search Report and Written Opinion, dated Jan. 29, 2014, 13 pages.

Application and File History for U.S. Appl. No. 14/043,440, filed Oct. 1, 2013. Inventor: Alexander.

Wikipedia, "Electric Power System," dated May 8, 2012, 7 pages.

EP Application No. 13817452.9, extended European Search Report dated Feb. 22, 2016, and supplemental European Search Report dated Mar. 10, 2016, 6 pages.

\* cited by examiner

SYSTEM AND METHOD FOR EFFICIENT DATA COLLECTION IN DISTRIBUTED SENSOR MEASUREMENT SYSTEMS

FIELD OF THE INVENTION

The invention relates generally to automated sensor data collection systems, such as utility meter reading systems or other systems in which data is collected from a large plurality of geographically distributed sensors to a central collection point and, more particularly, to facilitating increased real-time or near real-time knowledge of an individual sensor data measurement or the entire system of sensor data measurements at the central collection point without increasing the burden on system communications bandwidth that would otherwise require more frequent data collection reporting.

BACKGROUND OF THE INVENTION

Automatic meter reading ("AMR") is the technology of automatically collecting consumption, diagnostic, and status data from utility meters (e.g., water or energy metering devices such as gas or electric) and transferring that data to a central database at the system head end for billing, analyzing usage, and controlling the utility infrastructure. AMR and the Advanced Metering Infrastructure (AMI) that facilitates the associated utility systems communications and control are thus a particular example of the broader category of automated sensor data collection systems in which distributed monitors and sensors provide information that can be centrally collected and processed and used as a basis for implementing centralized or distributed system controls. The nature of the particular service control applications being supported dictates the degree to which more frequent (recent) and more precise information must be collected from the remote sensors to support central system decisions. The larger the network of sensors and the more frequent the need to have individual and system-wide sensor knowledge at the central processing site, the greater is the demands that are placed on the communications infrastructure.

AMR technologies as a representative of the greater class of automated sensor collection systems have include hand-held, mobile and network technologies based on telephony platforms (wired and wireless), radio frequency (RF) collection using licensed or un-licensed bands in the RF spectrum, or powerline transmission. See generally http://en.wikipedia.org/w/index.php?title=Automatic_meter_reading&oldid=490465329. Originally, this technology was developed to save utility providers the expense of periodic trips to each physical location to read a meter. Over the years, various advances in metering technology have led to the ability to read consumption values with much greater frequency and storing those readings until they are reported to the central collection system, thus providing additional functionality of interval metering to support demand billing, time-of-day metering, consumption trend analysis, and the like. Advanced metering capabilities have also lead to an expansion in the type of data that can be monitored, measured and reported, including, for example, information such as voltage and other measures of power quality that when available centrally can further expand the real-time operational understanding of the electrical transmission and distribution network.

Recent developments in the evolution of AMR systems have been directed towards deployment of fixed networks in urban, suburban and rural environments. A fixed AMR or grid sensor network more generally is one where a network is permanently installed to capture readings from utility meter endpoints or other electrical grid sensors or devices located at each customer's home or business or at strategic locations across the transmission or distribution infrastructure. The network can include a series of antennas, towers, collectors, repeaters, or other permanently installed infrastructure to collect transmissions of meter readings or other grid sensor data from AMR-capable meters and electrical sensor devices and deliver the data to the head end without the use of hand-held or vehicle-mounted collection devices.

Fixed networks enable not only the frequent sampling of meters at their respective locations, but also collection of these high-frequency consumption readings by the AMR system for reporting to the head end. This functionality is particularly valuable in electrical power systems, where power must be generated and managed simultaneously with the present consumption needs since generated electricity cannot currently be stored in any practical way to meet significant peaks in demand. High-frequency collection can facilitate real-time or near real-time reads, power outage notification, virtually instantaneous load distribution monitoring, and power quality monitoring. Power system utility providers can thus better manage the capacity, efficiency, and cost of their operations by responding rapidly to changes in load distribution and other events.

One challenge that accompanies high-frequency data collection from a large number of endpoints is the system-wide communication bandwidth required to support the increased network traffic. Moreover, in a wireless collection system, the increased occurrence of radio transmissions from each of the large plurality of endpoint devices may cause an increase in communications data traffic overhead. For example, simultaneous transmissions from multiple endpoint devices on the same channel can result in data collisions and failure of one or more of those transmissions, requiring re-transmission and, consequently, even greater bandwidth utilization.

Another challenge with frequent sensor data collection is managing the increased amount of data delivered to the head end system. The data storage and data processing capacities at the head end system must be able to support the massive amount of real-time or near real-time data that can result from the need for finer granularity of data availability at the collection system.

Current AMR and other grid sensor systems are typically configured according to the limitations of the available communications network resources by setting sustainable sensor data measurement recording and reporting intervals. The systems are also configured with sufficient network bandwidth margin allowances reserved to support instantaneous on-demand sensor data requests for a very limited fraction of the endpoint device population to address any inability to provide real-time or near real-time data across the wider network of sensors. The current state of the art can provide the ability to obtain real-time or near real-time metering or sensor measurements at the head-end system for any given individual endpoint, or the ability to collect real-time or near real-time measurements for all remote devices (that is, at a common, current time) only by increasing remote data recording and reporting frequency with an associated increase in network transport bandwidth to ensure that the data is continually available at the head end. Supporting the capability for the central collection system to have more current availability of information across a more widespread sensor population also requires increased remote and head-end system data storage.

An important problem for sensor data collection systems is a periodic need to be able to ascertain with a high degree of precision, in real-time or near real-time, the current individual sensor and/or system-wide status or value of a given monitored variable. Deploying a communications network with the transmission capacity to satisfy this important though potentially infrequent requirement as well as the infrastructure to support the associated data handling requirement on a continual basis would represent a very inefficient application of system resources. What is needed instead is a solution that can provide the necessary individual sensor and/or system-wide status or value, whenever required, within the capabilities of a communications infrastructure that is more closely sized to the typical needs of the average, or typical volume of data collection and reporting.

SUMMARY OF THE INVENTION

Aspects of the invention exploit the characteristic of localized stationarity and short-term predictability of data in certain types of sensor data collection systems. This characteristic is used beneficially to reduce the amount of data transmissions through the data collection system to the central data collection point. The characteristic of short-term data predictability is also useful for reducing the data storage burden throughout the sensor data collection system. Thus, according to one aspect of the invention, endpoint devices make measurements at a relatively fine granularity (short time intervals), but provide regular reporting to the central data collection point at a relatively coarse granularity (longer time intervals). In spite of the lack of fine-granularity regular reporting, the central data collection point can predict the value of fine-granularity data. Moreover, according to one embodiment, since the remote device is able to execute the same prediction as the central collection point while performing sensor measurements, if the prediction is wrong, the endpoint device autonomously provides an exception report that supplies accurate data for the fine-granularity measurement (or for measurement of a time granularity that is finer than the relatively coarse time granularity).

One aspect of the invention is directed to a method for operating a sensor data collection system for collecting data from a plurality of endpoint devices. A central data collection point receives sensor data generated at each of the plurality of endpoint devices, the sensor data representing a series of actual measured values. The central data collection point maintains a database containing records corresponding to the individual endpoint devices and including historic values of sensor data for those endpoint devices. Predicted values are computed representing presumed sensor data for at least one endpoint device based on the historic values of sensor data corresponding to the at least one endpoint device. The central data collection point receives exception data generated by the at least one endpoint device, the exception data representing a discrepancy between at least one of the predicted values and a corresponding at least one actual measured sensor data value. In response to receiving the exception data, the at least one of the predicted values is superseded based on the exception data.

Another aspect of the invention is directed to an endpoint device for use with a sensor data collection system for collecting data from a large plurality of sensors. The endpoint device includes a sensor data input module configured to obtain actual measurements from a sensor at a relatively fine time granularity. The endpoint device further includes a reporting module operatively coupled to the sensor data input module and configured to generate reports for receipt by a central data collection point. The reports include: regular reports containing a portion of the actual measurements representing sensor measurements at a relatively coarse time granularity; and exception reports, each exception report containing information representing one or more of the actual measurements that differ in time granularity from the coarse granularity of the regular reports, each of the exception reports being generated in response to a determination that at least one of the one or more actual measurements differs from a predicted value for that at least one of the one or more actual measurements by an amount that exceeds a pre-established limit. In various embodiments, the different time granularity of the one or more of the actual measurements represented in the exception reports can be the relatively fine granularity with which the endpoint device obtains the actual measurements, or a different time granularity that is finer than the coarse granularity of the regular reports.

BRIEF DESCRIPTION OF THE DRAWINGS

The invention may be more completely understood in consideration of the following detailed description of various embodiments of the invention in connection with the accompanying drawings, in which.

Figure 1:
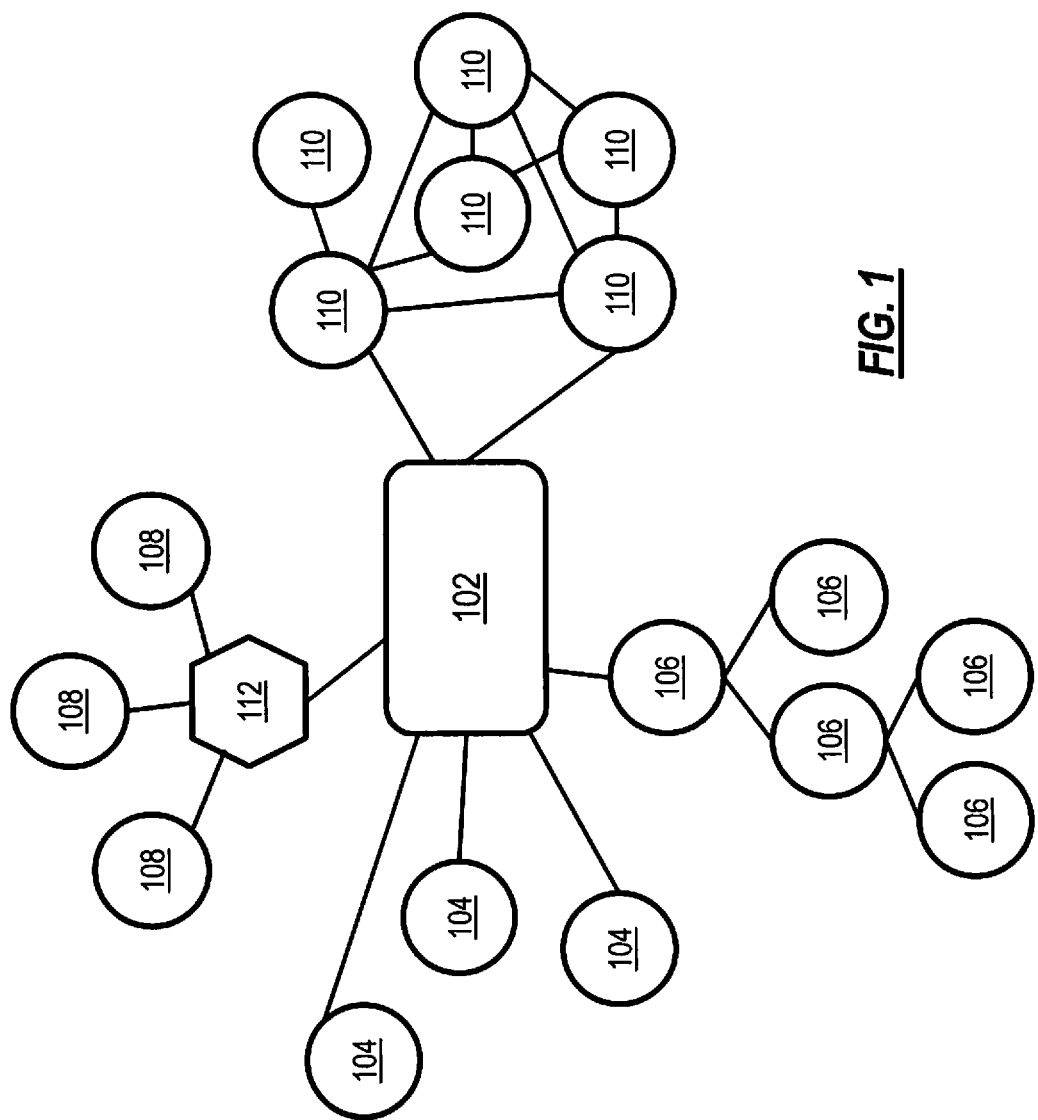
FIG. 1 is a block diagram illustrating an exemplary sensor data collection system, such as an AMR system, in which aspects of the invention may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to improving the data collection efficiency by limiting communications bandwidth requirements as well as data collection and storage requirements in sensor data collection systems. This is achieved by taking advantage of the computation capabilities of distributed sensor measurement and collection devices that are able to process their locally monitored and collected subset of the overall system data. A sensor data collection system in the present context refers to any system that includes a spatially distributed set of communication devices for transmitting sensor data originated by a large plurality of spatially distributed sensors. In the following detailed description, example embodiments are described primarily in the context of automatic meter reading (AMR) systems in which the spatially-distributed sensors include utility meters such as electricity, water, gas, and the like, that are specifically adapted for measuring data relating to the distribution or consumption of a utility commodity. However, unless it is expressly limited in a particular claim, the present invention is applicable more generally to any sensor data collection system, such as, for instance, industrial process monitoring systems, environmental phenomenon monitoring systems, infrastructure monitoring systems, etc., where the various sensors regularly provide their measured data through the communication devices to a central data collection point, or, more generally, where reported data measures can be modeled and predicted or local stationarity established.

Each of the spatially-distributed sensors is associated with an endpoint device that facilitates communication of information from the sensor. Oftentimes, the sensors themselves may be integrated with the endpoint devices as unitary multifunctional devices. Other times, endpoint devices are independent devices that, in operation, are suitably interfaced with their respective sensors to obtain sensor readings produced by the sensor devices. For the sake of brevity, both types of arrangements of endpoint devices are referred to herein simply as endpoint devices or, simply, endpoints.

The central data collection point is a point where a large plurality of endpoints send their data to be consumed. Consumption of collected data in this context refers to use of the data for any of a variety of purposes, including one or more of such activities as processing of the data for billing purposes, system status determination and analysis, system performance optimization, issuing control signals or commands in response to the received data, etc. In an AMR system, a central collection point is oftentimes referred to as a head end. In a given sensor data collection system, there may be one, or even more than one, central data collection point. The central data collection point need not actually be at the top of a hierarchy of nodes in the sensor data collection system. Principles of the invention can apply to even an intermediate device that collects and consumes data from a plurality of endpoint devices that comprise a subset of the data collection system.

FIG. 1 is a block diagram illustrating an exemplary sensor data collection system, such as an AMR system, in which aspects of the invention may be implemented. A central data collection point 102, such as an AMR system head end, receives sensor data sent by a plurality of endpoint devices 104, 106, 108, and 110. Various network topologies may be used, including more than one topology in combination. To illustrate, endpoint devices 104 are arranged in a star topology. Endpoint devices 106 are arranged in a multi-hop model in a tree topology.

Endpoint devices 108 transmit data through an intermediary device such as a repeater or collector, whose primary function is to relay or otherwise forward that data to the central collection point 102. Endpoint devices 110 are arranged in a multi-hop mesh topology where the individual endpoints may self-configure to determine an optimal path for transmitting information from one device to another, ultimately to the central collection point 102. Other topologies not shown herein, e.g., ring topology, bus topology, daisy-chain, etc., are also contemplated.

Figure 2A:
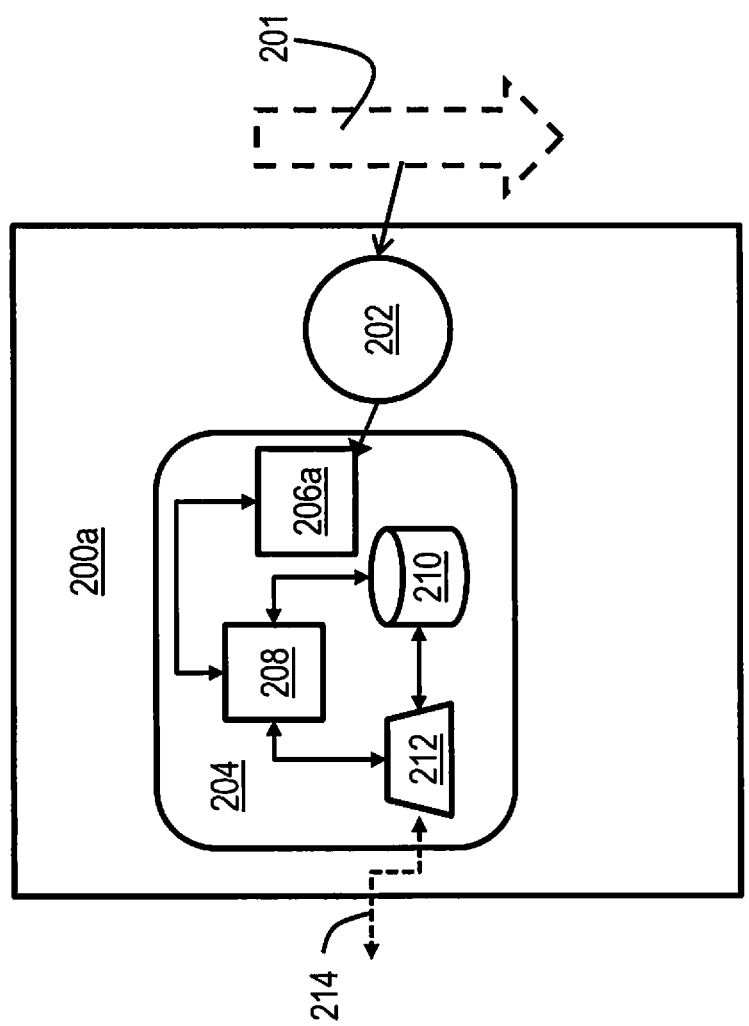
FIGS. 2A and 2B are a block diagrams illustrating exemplary endpoint devices according to various types of embodiments.
Figure 2B:
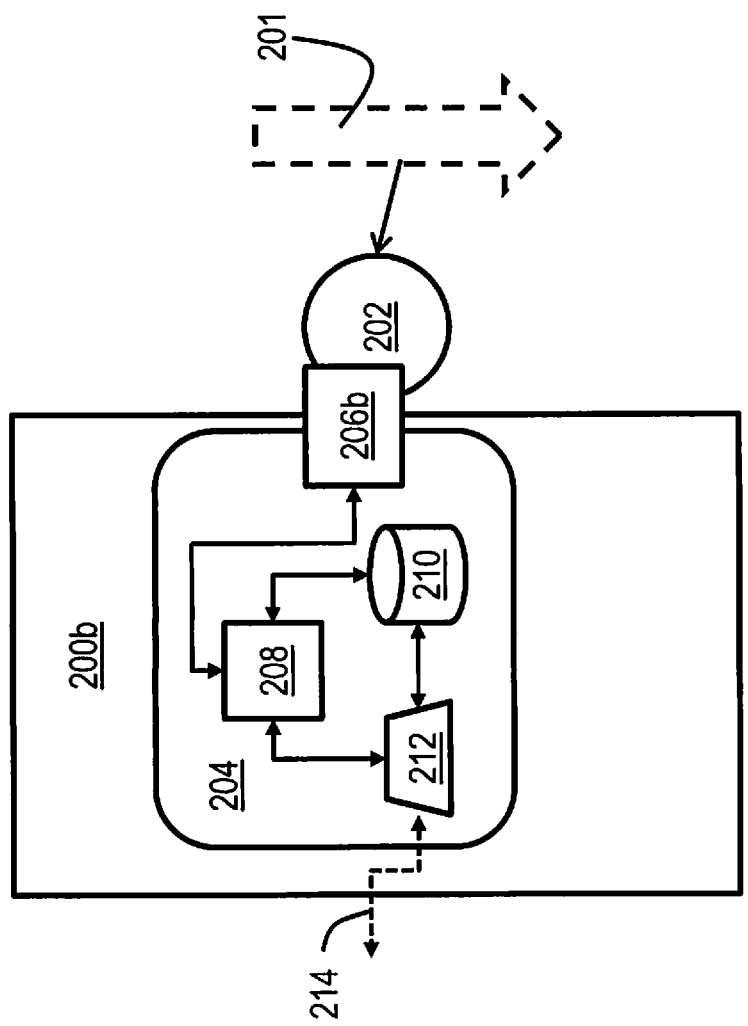

FIGS. 2A and 2B are a block diagrams illustrating exemplary endpoint devices 200a and 200b according to various types of embodiments. Endpoint device 200a is a compound endpoint device (such as a smart meter, for example), that includes a sensor 202 that is configured to measure an event, state, natural phenomenon, etc., indicated at 201. In an AMR system event 201 represents energy or water utilization, for instance. Data from sensor 202 is provided to endpoint circuitry 204 via interface circuit 206a that interfaces with the sensor electrically.

Endpoint device 200B is a peripheral device that is adapted to interface with a stand-alone sensor 202 via interface device 206b. Interface device 206b interfaces with sensor 202 electrically, mechanically, or optically, as appropriate. An electrical interface can include a digital communications interface such as a serial port, or an analog input with analog-to-digital conversion (ADC). An example of a mechanical interface is an encoder component, which may be magnetically coupled to the sensor; an example of an optical interface is a photosensor or digital imaging device for reading a rotating disc in a utility meter or for reading the gauges thereof.

Interfaces 206a and 206b obtain sensor data from sensor 202 via sampling of the sensor output. The sampling can take place in response to the occurrence of certain sensed events, or according to a pre-established interval schedule. Sensor data is passed to controller 208, which can store certain samples in data store 210. Controller 208 also controls the reporting of certain sensor data measurements and other information to the central data collection point. Transceiver 212 conducts communication over a wired or wireless medium 214, including sending reports addressed to the central data collection point (directly or via other intermediate endpoints or other devices), and receives instructions, control signaling, or configuration information from the central data collection point or from other devices.

Aspects of the invention exploit the characteristic of short-term predictability or localized stationarity of data in certain types of sensor data collection systems. In AMR systems, for example, the totalized consumption of a utility commodity, as measured at an endpoint device, increases as a function of time. The rate at which the utilization of the commodity at a particular home or business increases over time is generally predictable based on a number of parameters, including recent measurements of that customer, historic patterns of consumption specific to the customer based on the time of day, day of the week, seasonality, etc., as well as on measured or reported local weather at each endpoint's location (e.g., warmer weather in the summertime will predictably cause increased electricity utilization due to increased use of air conditioning; whereas warmer weather in the winter, in colder climates, will predictably cause decreased electricity utilization for customers using electrical energy for heating their home or business). This characteristic of short-term and localized predictability is used to reduce the amount of data transmissions through the data collection system to the central data collection point.

Thus, according to one aspect of the invention, endpoint devices make measurements at a relatively fine granularity, but provide regular reporting to the central data collection point at a relatively coarse granularity. In spite of the lack of fine-granularity regular reporting, the central data collection point can predict the value of fine-granularity data. Moreover, if the prediction is wrong, the endpoint device provides an exception report that supplies accurate data for the fine-granularity measurement. As will be detailed in the following examples, according to one embodiment, each endpoint performs the same prediction as the central data collection point and further performs a comparison between each predicted value and the corresponding actual measured value. The difference between these two values is further compared against an accuracy criterion that defines an error tolerance. If the error is within the allowed tolerance, the central data collection point's prediction is deemed sufficient and correction of the prediction (which would require transmission bandwidth through the sensor data collection system) is avoided. If, on the other hand, the error exceeds the allowed tolerance, then the endpoint device transmits the exception report containing the actual measured values, or information that would permit the central data collection point to generate the actual measured values (or a value sufficiently close to the actual measured values).

The prediction and comparison operations can be performed by each individual endpoint according to one embodiment. In a related embodiment, these operations (or some portion of them) can be performed by another endpoint or some other node on behalf of the measuring endpoint. This approach would utilize localized communication resources between these collaborating devices, but still preserve availability of communication bandwidth through the sensor data collection system to the central data collection point, which would otherwise occupy the central data collection point's resources and, depending on the network topology, resources of other endpoints along the routing path to the central data collection point.

Figure 3:
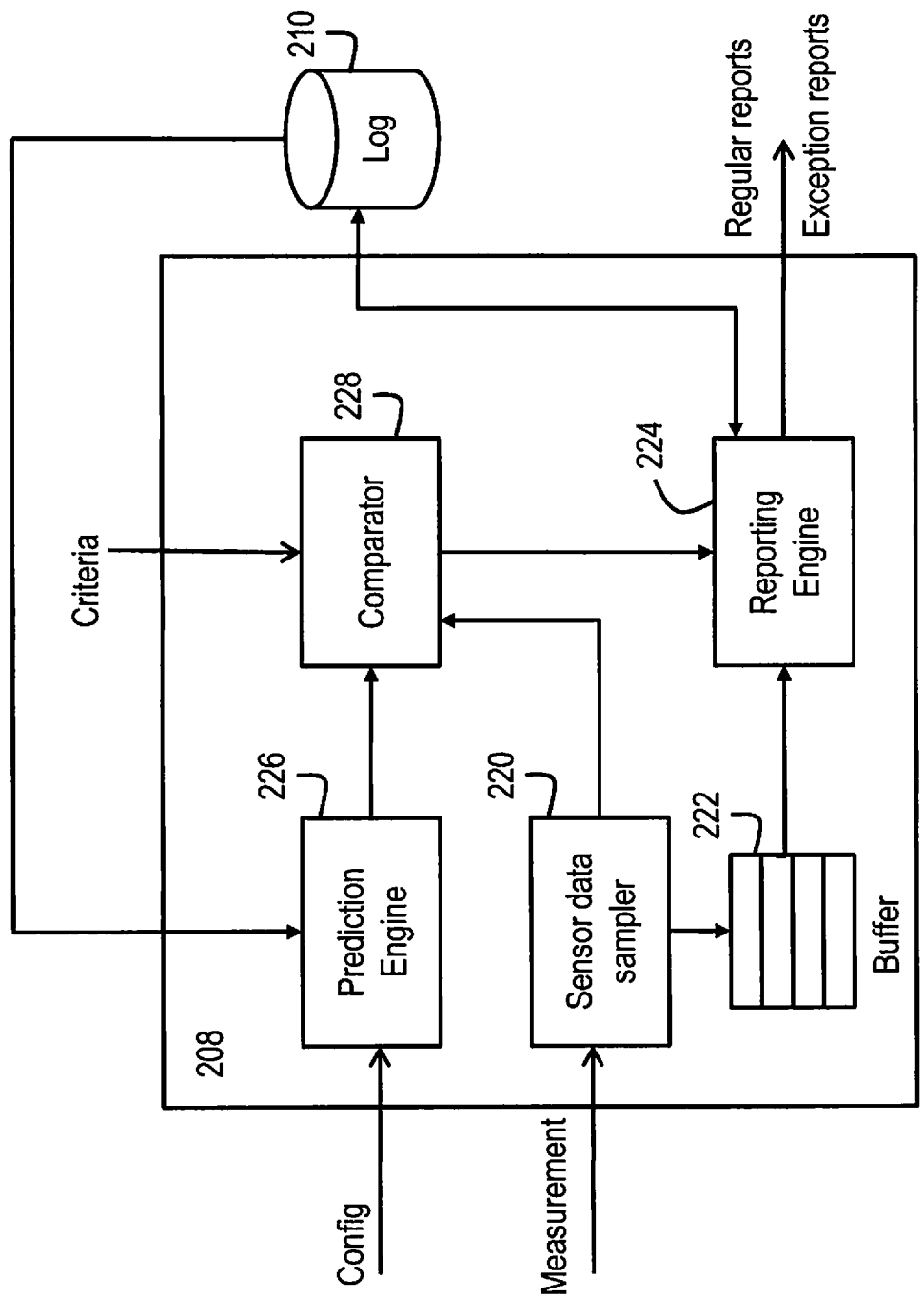
FIG. 3 is a block diagram illustrating various modules of an endpoint device according to one type of embodiment.

FIG. 3 is a block diagram illustrating various modules of an endpoint device according to one type of embodiment. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. Accordingly, each module can be realized in a variety of suitable configurations, and should not be limited to any particular implementation exemplified herein. In the particular example depicted, the modules are implemented as software instructions and data structures being executed on a microprocessor-based controller 208 having a data store and input/output facilities. In general, the controller circuitry is well-known, and any suitable controller hardware may be employed. The various modules depicted can be implemented using the same set of hardware which, for each module, is given specific functionality by the corresponding program instruction logic. In other approaches, there can of course be separate hardware devices dedicated to certain ones (or combinations) of some modules but not others.

Sensor data sampler module 220 is configured to obtain each item of measurement data from interface 206a/206b and store it a local buffer 222. Data samples can be obtained at regular intervals, the period of which can be configured, in response to some external event, or at the request of a remote device (e.g., a head end or intermediate collection device). In one particular approach, the sensor is sampled and the sensor data is buffered at an interval that is of a finer granularity than intervals at which regular reporting is sent to the central data collection point.

Reporting is performed by reporting engine 224. This module is configured to prepare regular reports at a particular reporting interval that is of a coarse granularity compared to the sampling interval, or in response to an event or request according to various embodiments. Also, reporting engine 224 is configured to prepare exception reports when called for by operation of comparator module 228. Regular reports in this context means ordinary reports, i.e., those sent in un-exceptional circumstances (i.e., when the difference between the predicted values and actual measured values are within pre-established limits). The term regular should not be read to require regular periodicity of the reports, though certain embodiments could operate in this manner.

Prediction engine 226 generates predictions of sensor data according to an algorithm that produces essentially the same result as the algorithm used to make predictions at the central data collection point. This module operates based on stored historic data from data store 210, which is the same data that has been provided to the central data collection point. The prediction algorithm is changeable in a related embodiment based on a configuration input. The predicted values and actual measured values from the sensor data sampling module 220 are passed to comparator module 228, which compares these values to determine an amount of error between them. This error is compared against comparison criteria, which can be adjusted in some embodiments, to determine whether an exception report is called for.

Figure 4:
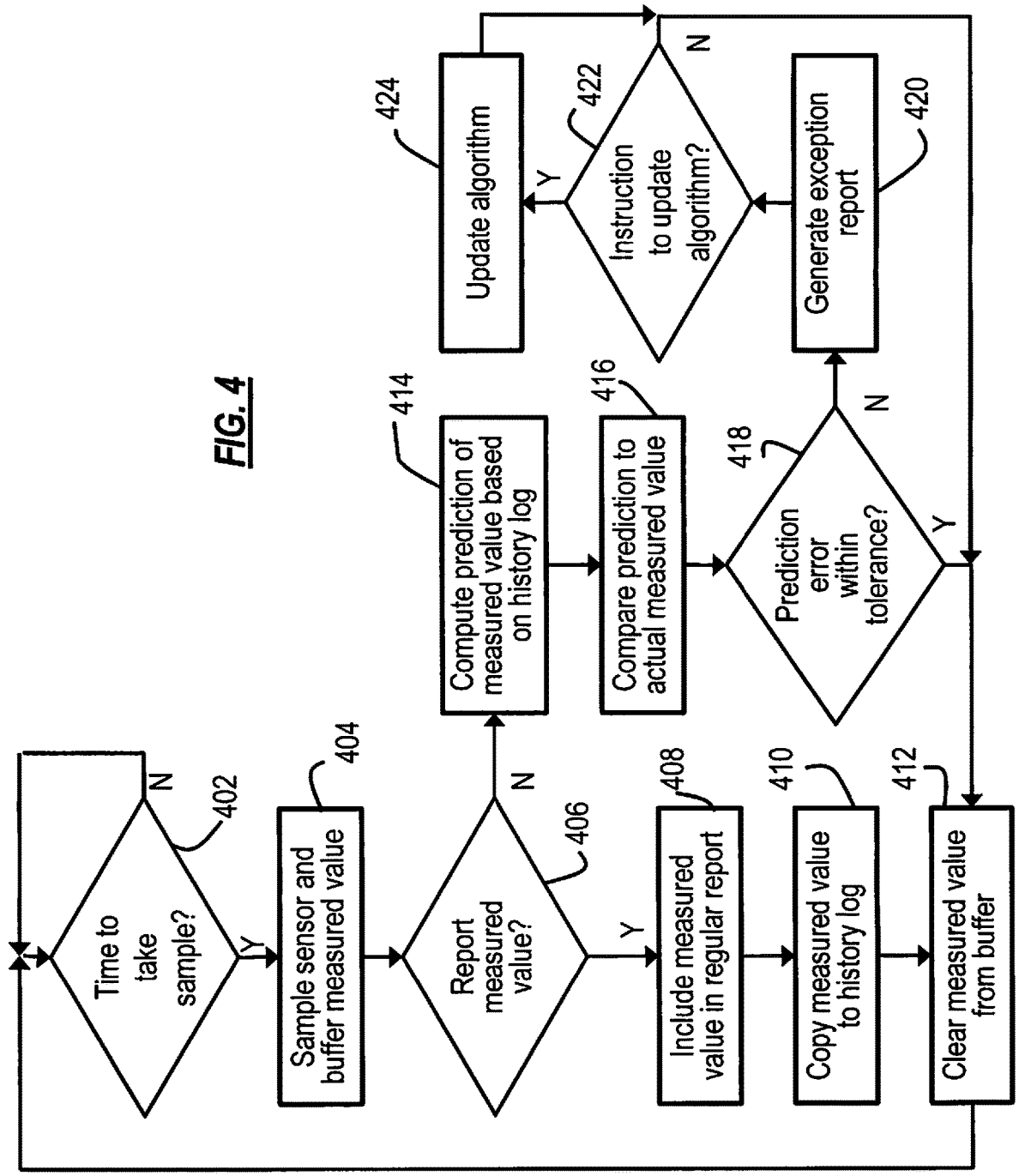
FIG. 4 is a flow diagram illustrating the operation of an endpoint device according to an example embodiment.

FIG. 4 is a flow diagram illustrating the operation of an endpoint device according to an example embodiment. At decision 402, the sampling module determines whether it is time to sample the sensor. At 404 this sampling takes place at relatively short intervals for a fine granularity of measurement, and the measured value is stored in a short-term buffer. At decision 406, the endpoint device determines if the measured value is to be reported at the regular reporting interval. If it is, then at block 408 the measured value is included in the regular report. In embodiments where the regular report contains only one measured value, the regular report can be sent out at this point. In other embodiments, where the regular reports contain multiple measurements, such as interval data in AMR systems, the measured value to be included in the report is stored in a designated location or otherwise tagged to be added to a regular report to be sent at a later time.

At 410, the measured value to be reported is added to the history log. The values stored in the history log are used to predict values. At 412, the logged value is cleared from the buffer. Referring back to decision 406, if the measured value is not to be included in the regular report, a prediction of that measured value is computed based on the previous reported measurements stored in the history log. Next, at 416, the predicted value is compared with the actual measured value. At decision 418, the difference between the compared values is checked against error tolerance limits. If the prediction falls within the allowed tolerance, the prediction is deemed to be good, and the measured value can be discarded. If, on the other hand, the prediction is not within the allowed tolerance, then the prediction is deemed not good, and an exception report is generated at 420. In other embodiments, where the regular reports contain multiple measurements, such as interval data in AMR systems, the measured value that led to the exception may be included in a report that includes prior regular reports that had been stored but not yet sent to the central data collection point. In such an embodiment a new series of measured values will be recorded and stored until another exception is generated or until a time interval given by the designated reporting frequency.

At decision 422 and block 424, the endpoint device responds to an instruction, if any, to update the prediction algorithm. The instruction can come from the central data collection point in response to a determination of too-frequent exception reports or due to other application specific refinements of the sensor data prediction algorithm.

Figure 5:
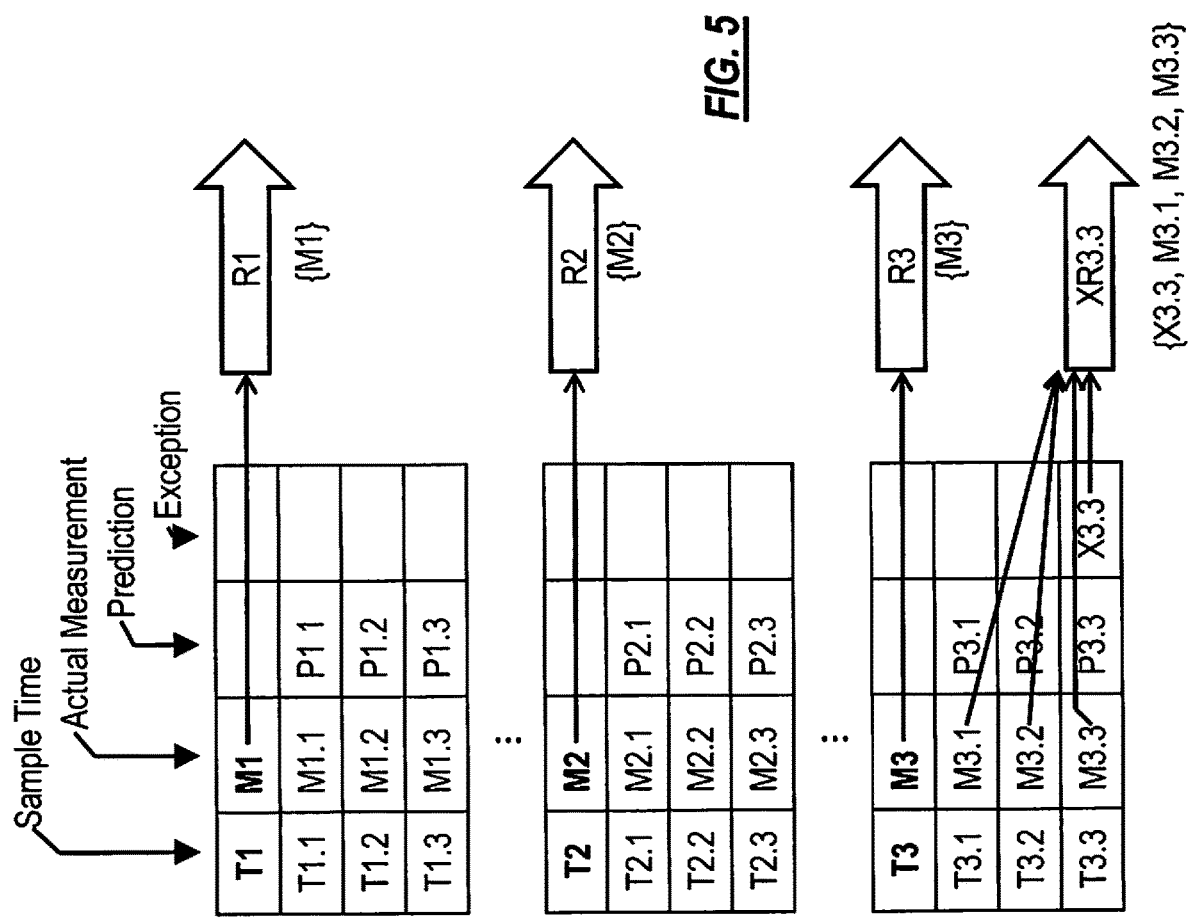
FIG. 5 is an information flow diagram illustrating operation of an endpoint device configured to send simple, single-measurement, consumption reports according to one embodiment.

FIG. 5 is an information flow diagram illustrating operation of an endpoint device configured to send simple, single-measurement, consumption reports according to one embodiment. Times T1, T2, and T3 represent regular reporting intervals. Measurements M1, M2, and M3 made at these times are each reported in regular reports R1, R2, and R3. In this example, the time intervals between times T1 and T2 and between T2 and T3 are at a coarse granularity. However, there are a series of measurements made at a finer granularity by the endpoint device based on system configuration of the granularity and accuracy with which information must be determined at the central data collection and processing point. These are represented at times T1.1-T1.3, T2.1-T2.3, and T3.1-T3.3. Respective measurements are made at these finer-granularity intervals. Also, for each fine granularity time, a prediction P is made as shown. Thus, for example, at time T2.3, measurement M2.3 is made and prediction P2.3 is computed. Each prediction P is based on previously-reported data, such that the endpoint device and the central data collection point can compute a substantially similar or same prediction.

Each prediction P is compared against its corresponding actual measurement M, and the difference between the predicted and actual values are in turn compared against one or more limits. If any of the limits are exceeded, an exception report is generated. As depicted, this occurs at time T3.3. Exception X3.3 is recorded, and an exception report XR3.3 is prepared. In this example, exception report X3.3 contains the indication of an exception, namely X3.3, as well as the actual measurements since the last regular report, M3.1, M3.2, and M3.3. In a related embodiment, only measurement M3.3 is included for a shortened exception report. In a related embodiment, whichever additional measurements were provided in an exception report, those measurements are stored at the endpoint for use in computing future predictions.

Figure 6:
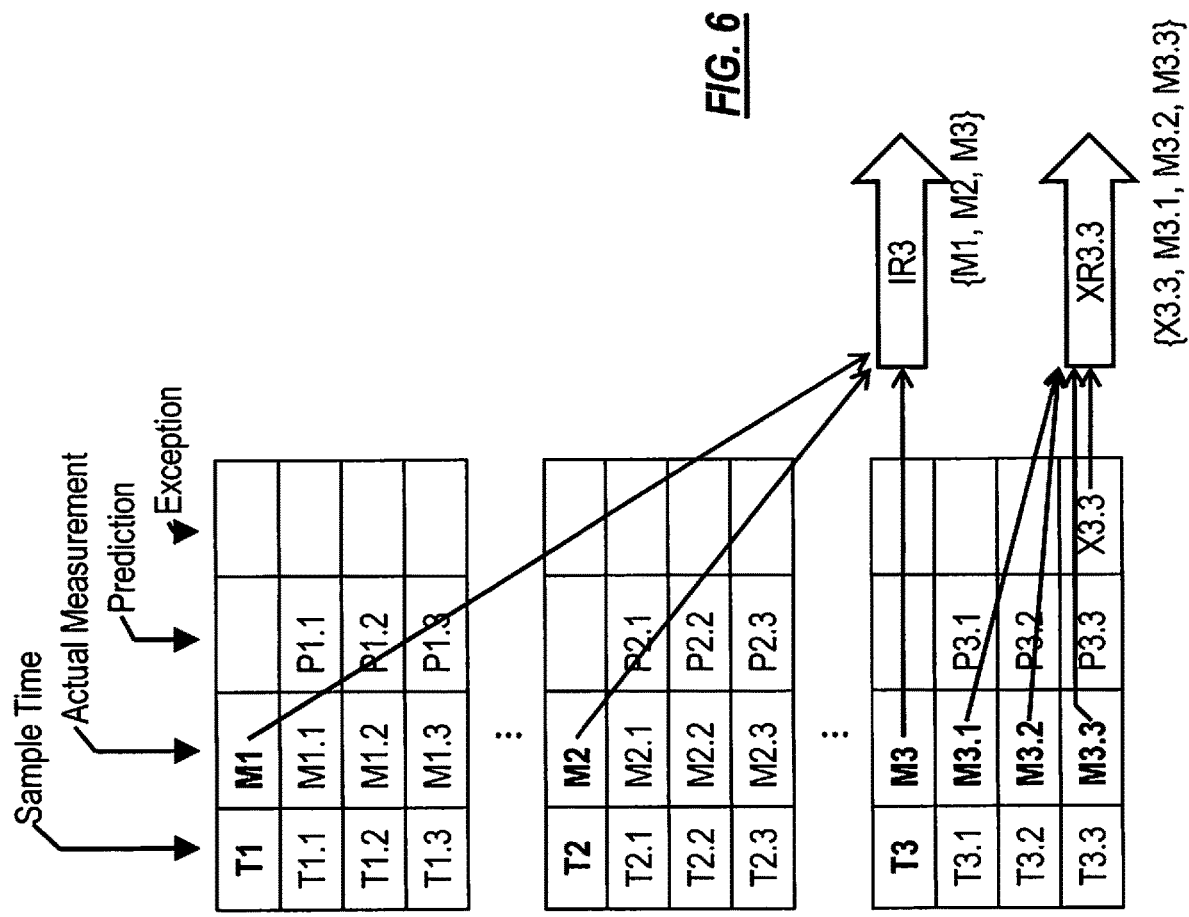
FIG. 6 is an information flow diagram illustrating an operation of a related embodiment in which the regular reports include interval data.

FIG. 6 is an information flow diagram illustrating operation of a related embodiment in which the regular reports include interval data. In this case, interval report IR3 includes measurements M1, M2 and M3 taken respectively at coarse-granularity time intervals T1, T2, and T3. As before, measurements are also made at fine-granularity time intervals T1.1, T1.2, etc., and values are predicted for these fine-granularity intervals also. In this example, an exception is identified at T3.3, leading to the creation of exception report XR3.3, which can include the fine-granularity measurements M3.1, M3.2, and M3.3 that followed the most recently-reported measurement, M3 or may just include the measurement M3.3. In a related embodiment the exception report may include the prior coarse interval measurements taken up to the time of the occurrence of the exception.

Figure 7:
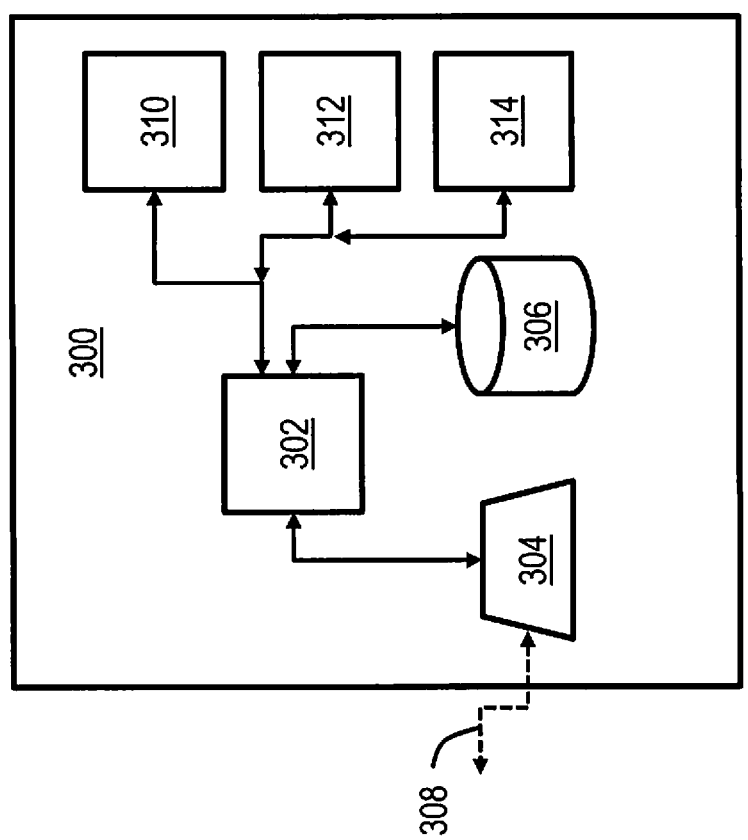
FIG. 7 is a block diagram illustrating an exemplary central data collection point in which certain embodiments can be an AMR system head end.

FIG. 7 is a block diagram illustrating an exemplary central data collection point 300, in which certain embodiments can be an AMR system head end. Controller 302 is operatively coupled to transceiver 304, data store 306, and various operational modules 310, 312, 314. In an AMR system head end embodiment, operational module 310 can be a customer billing system, module 312 a utility system analyzer, and module 314 a utility system control module.

Figure 8:
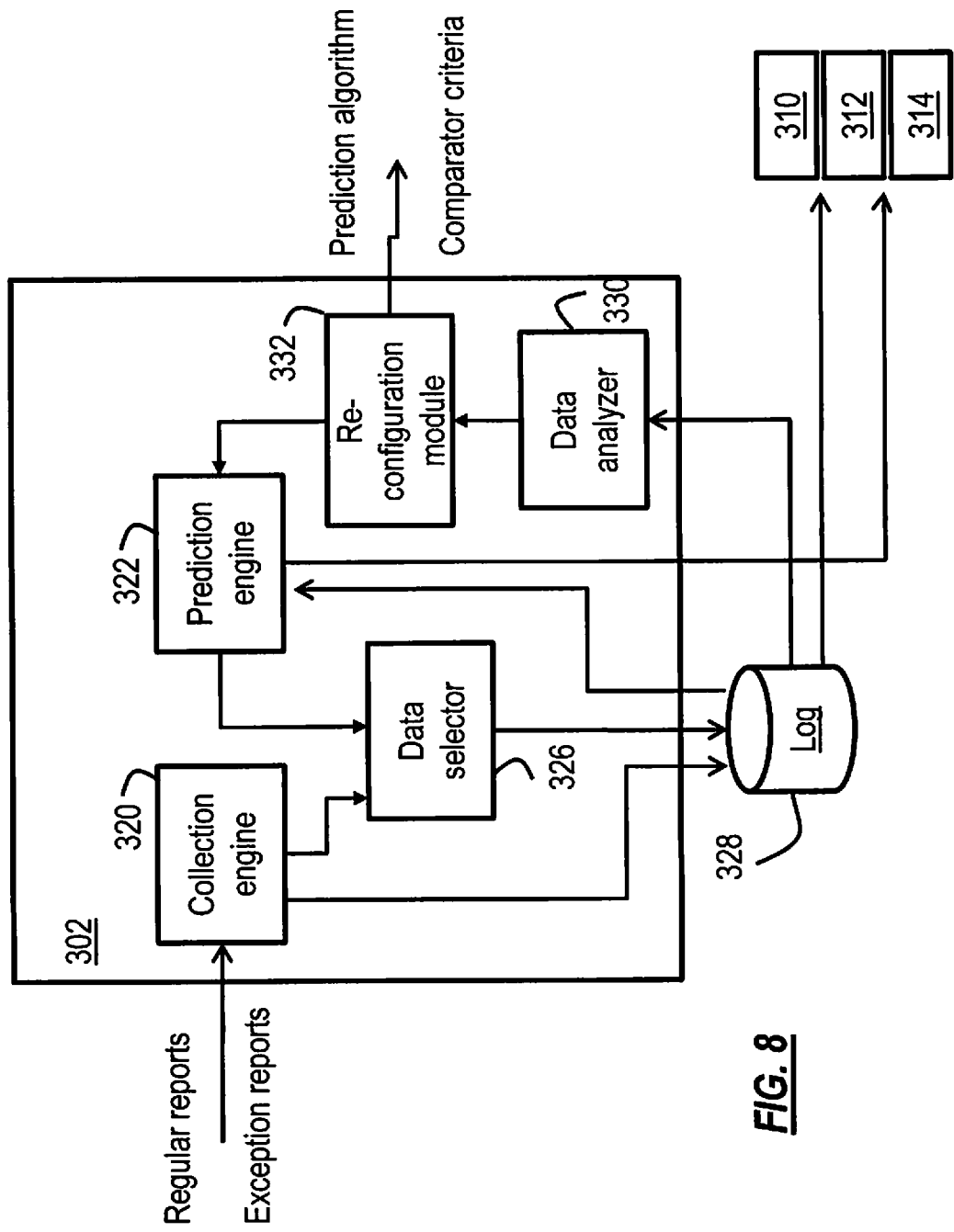
FIG. 8 is a more detailed block diagram illustrating some of the various modules in the controller depicted in FIG. 7 according to one embodiment.

FIG. 8 is a more detailed block diagram illustrating some of the various modules in controller 302. Regular reports and exception reports are passed to the collection engine 320 from the transceiver. The incoming data is saved in log 328 using the data store facility. Meanwhile, prediction engine 322 generates predictions of finer-granularity data than the reported incoming data. The predictions are based on historic measurements for each endpoint device, and are specific to each endpoint device. Data selector module 326 determines whether to store any of the predicted values in the log 328. Depending on the operating configuration, predicted values may be stored for a relatively short-term so that analysis can be performed to determine rates of change in a given endpoint's output, for example; or, in other configurations, the predicted values may be generated and analyzed right away, making storage in log 328 unnecessary. In this latter case, the predictions are stored in scratchpad memory, but not necessarily in a database record. Data selector determines if an exception report having data representing actual measurements is present, in which case the predicted values corresponding to those sample times is superseded. In a related embodiment, actual measured data from exception reports is stored in log 328, to be used by prediction engine 322 to generate new predictions along with measurement data from regular reports.

Data analyzer module 330 reads logged historical data and determines if the prediction parameters need to be adjusted. For instance, if there is a high frequency of exception reports, this suggests the prediction algorithm is not adequate. In this case, re-configuration module 332 makes adjustments to the prediction algorithm's parameters, or the comparator criteria, and passes an instruction to the transceiver for delivery to the endpoint. Once receipt of the instruction is confirmed, re-configuration module 332 adjusts the prediction algorithm's parameters in prediction engine 322.

Figure 9:
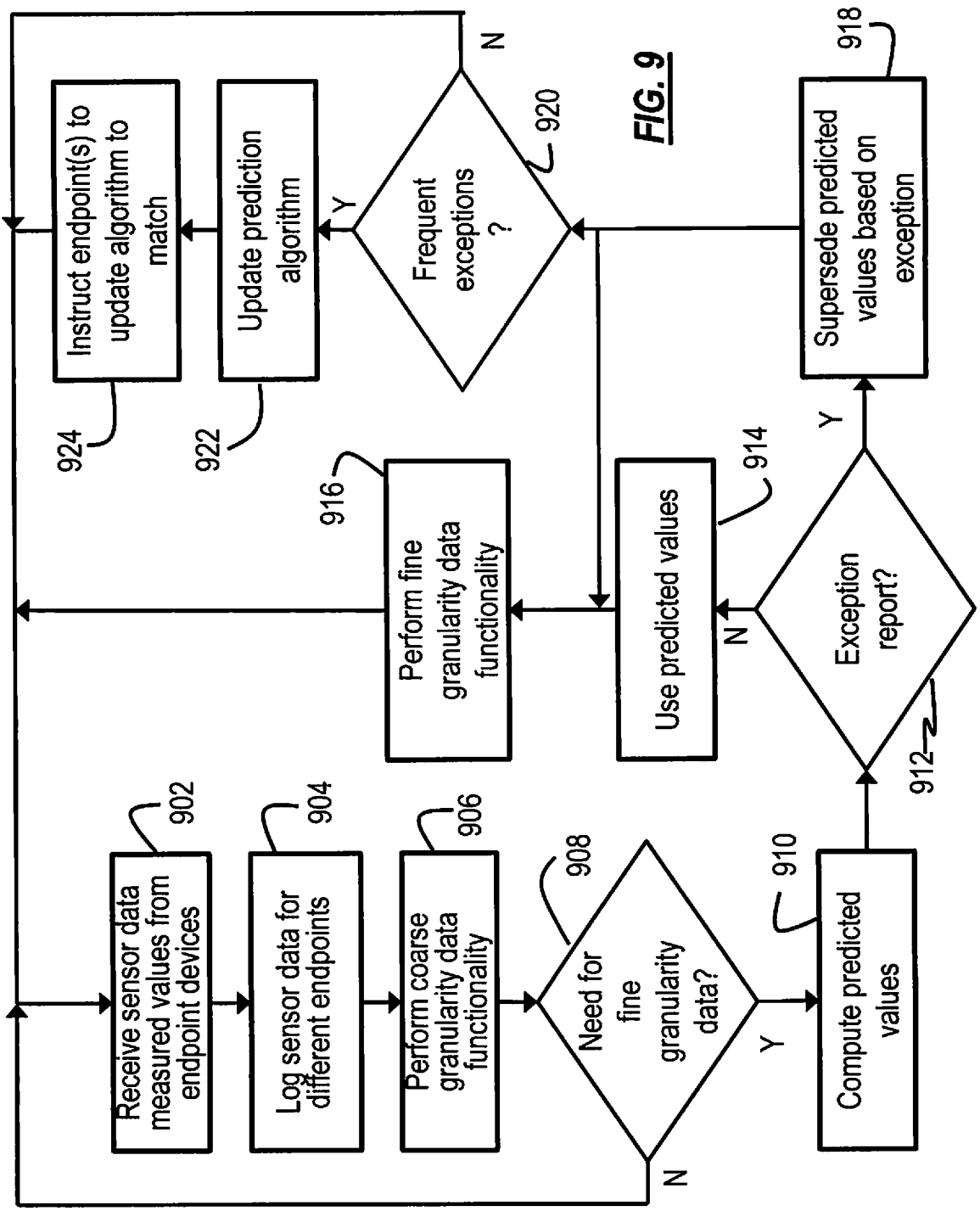
FIG. 9 is a process flow diagram illustrating the operation of a central data collection point according to one embodiment.

FIG. 9 is a process flow diagram illustrating the operation of a central data collection point according to one embodiment. At 902, the central data collection point receives sensor data from one or more endpoint devices. At 904 the received sensor data is logged. At 906, the central data collection point performs its application-defined data processing functionality based on the coarse granularity data received. In an AMR system, such application functions include billing, and certain types of utility service control. Decision 908 determines whether there is a need for fine granularity data from any particular endpoint devices, or from all of the system's endpoint devices. If there is no such need, the process loops back to block 902. Otherwise, in response to a determination of a need for fine granularity data, the central data collection point computes predicted values at 910.

At 912, a decision is made as to whether an exception report has been received from any of the endpoint devices. If there is no exception report for one or more endpoint devices, the predicted values for those one or more devices are used at 914, and passed to the operational modules that perform fine granularity data functionality. If, however, there is an exception report from any particular endpoint devices, at 918 the predicted values for those endpoints are superseded by the actual measurements received in the exception report (or re-generated locally at the central data collection point based on the exception report). Note that in embodiments where multiple measurements are provided in an exception report, the actual values of those measurements can be used to supersede previous predicted values (even though those predicted values were within the allowed tolerance) for improved accuracy. The fine granularity data functionality is then performed at 916 using the actual measurement data that superseded the predicted values.

Blocks 920, 922 and 924 relate to updating of the prediction algorithm. At 920, by operation of a data analyzer, the central data collection point determines if the amount or frequency of exceptions from any specific endpoint device is of a frequency exceeding a pre-established limit. In that case, an updated prediction algorithm is generated at 922, and at 924 instructions are generated for reconfiguration of specific endpoint devices to update their prediction algorithms.

One example of a prediction algorithm that can be applied at the central data collection point and at the endpoints is an approach derived from a standard Auto-Regressive Integrated Moving Average (ARIMA) model. This model represents a general class of models for forecasting time series data that can be stationarized through transformations such as differencing and taking logarithms; the stationarized data having statistical properties that are the same in the future as they have been in the past.

A non-seasonal ARIMA model is classified as an "ARIMA(p,d,q)" model, where:

p is the number of autoregressive terms, d is the number of non-seasonal differences, and q is the number of lagged forecast errors in the prediction equation.

Seasonal adjustments, as may apply to the particular sensor measurement data can also be incorporated by estimating and removing seasonal effects from the collected historical time series data in order to better reveal and predict the non-seasonal features of the measured data.

Data prediction for a time series of collected measurements will begin by identifying the appropriate ARIMA model by identifying the order(s) of differencing needed to stationarize the series and to remove the gross features of seasonality, optionally in conjunction with a variance-stabilizing transformation such as logging or deflating. Analysis of the particular interval data being measured by the endpoint devices will allow for an appropriate determination of the elements to be applied to the prediction model. This analysis can be done for past collected system data and used to create updated prediction models that can be downloaded to the endpoint devices. In the case of an AMR sensor data collection system the network can support the capability for algorithms to be refined and updated as part of a software updating feature that exists within the network that allows firmware on the endpoint devices to be updated when required.

An example of the prediction model for AMR meter sensor data may be one given by a "mixed" model ARIMA (1,1,1), where single autoregressive, non-seasonal and lagged forecast error term is applied, and where past interval data is used to derive the equation constants. The model is given by the following:

$$\hat{X}(t) = \alpha + X(t-1) + \beta(X(t-1) - X(t-2)) - \theta\varepsilon(t-1),$$

Where $\hat{X}(t)$ is the measurement data prediction at time t based on past period measurements $X(t-1)$ and $X(t-2)$ and past period prediction error $\varepsilon(t-1)$.

This particular prediction equation is simply a linear equation that refers to past values of the original measured meter data (regular reporting interval) time series and past values of the errors between the prediction and the measured values. This embodiment is thus illustrative of the ARIMA models that can be applied, with the prediction model being easy to implement and execute both at the central data collection point as well as at each of the endpoint devices even where there is limited computation capability at the endpoint devices.

Figure 10:
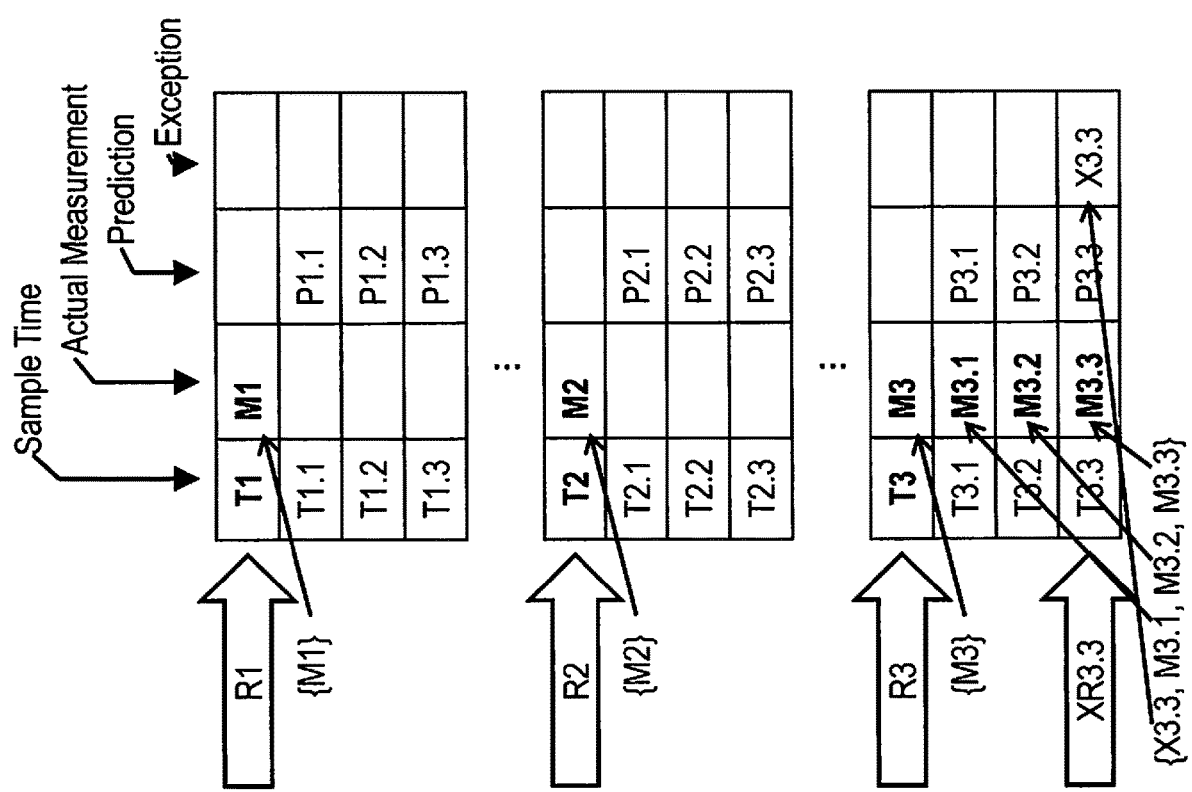
FIGS. 10-11 are information flow diagrams illustrating some of the operations of the central data collection point according to various embodiments.
Figure 11:
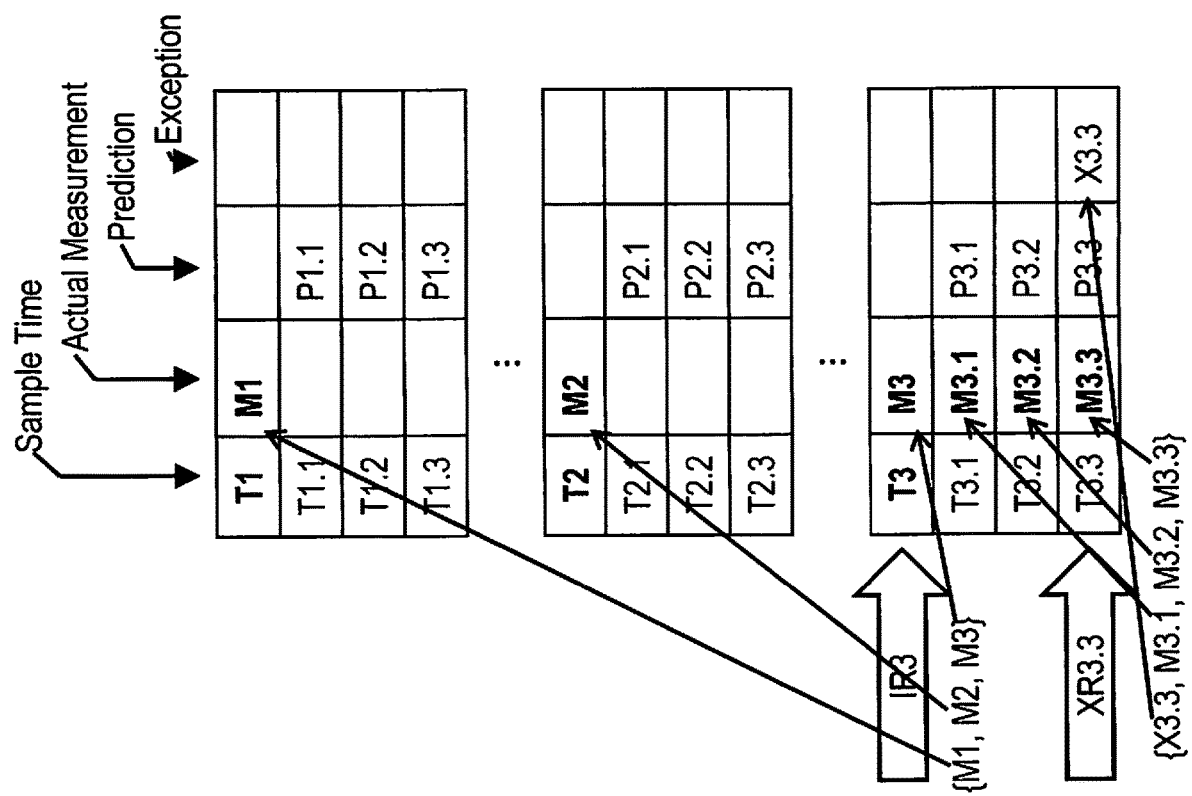

Turning now to FIGS. 10-11, information flow diagrams illustrating some of the operations of the central data collection point are shown. FIG. 10 illustrates an embodiment in which single-value regular reports R1, R2, and R3 are received containing measurements M1, M2, and M3, respectively. These measurements are received at coarse granularity times T1, T2, and T3, and stored in the log. At fine granularity times T1.1, T1.2, etc., predicted values P1.1-P1.3, P2.1-P2.3, and P3.1-P3.3 are computed. At time T3.3, an exception report XR3.3 is received containing an indication of an exception X3.3, along with preceding fine-granularity actual measurements M3.1, M3.2, and M3.3, which are stored in the log. The predicted values are superseded with the actual measured values. FIG. 11 illustrates a similar information flow, except that the coarse-granularity measurements M1, M2, and M3 are received in a single regular interval report, IR3.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for operating a sensor data collection system for collecting data from a plurality of endpoint devices, the method comprising:
   receiving, at a central data collection point, sensor data generated at each of the plurality of endpoint devices, the sensor data representing a series of actual measured power usage values;
   maintaining, at the central data collection point, a database containing records corresponding to the individual endpoint devices and including historic power usage values of sensor data for those endpoint devices;
   computing, at the plurality of endpoints, predicted power usage values representing presumed sensor data for at least one endpoint device, wherein the predicted power usage values are computed based on the historic power usage values of sensor data corresponding to the at least one endpoint device;
   comparing a discrepancy between at least one of the predicted power usage values and a corresponding sensor data value to determine whether the corresponding sensor data value constitutes either exception data or sufficiently accurate data;
   sending, from each of the plurality of endpoints, the exception data generated by the at least one endpoint device, and not the sufficiently accurate data, to the central data collection point at a first time granularity;
   sending, from each of the plurality of endpoints, the sufficiently accurate data at a second time granularity different from the first time granularity; and
   in response to receiving the exception data, superseding, at the central data collection point, the at least one of the predicted power usage values based on the exception data by replacing the predicted power usage values with the exception data.

2. The method of claim 1, wherein the sensor data represents utility consumption.

3. The method of claim 1, wherein the series of actual measured power usage values of the sensor data is measured at a first time granularity and the predicted power usage values representing the presumed sensor data represent sensor data measured at a second time granularity, the second time granularity being a finer granularity than the first time granularity.

4. The method of claim 1, further comprising:
   storing, at the central data collection point, actual measured power usage values of sensor data received from a first endpoint device and predicted power usage values corresponding to the first endpoint device in a common database record associated with the first endpoint device.

5. The method of claim 1, wherein computing the predicted power usage values is performed in response to a call for instantaneous measurement.

6. The method of claim 1, wherein computing the predicted power usage values is regularly performed at a condensed time interval that is shorter than a reporting interval at which the sensor data is regularly reported by each of the plurality of endpoint devices.

7. The method of claim 1, wherein the central data collection point computes the predicted power usage values using a first computation algorithm; and
   wherein in receiving the exception data, the central data collection point obtains information about the discrepancy based on a prediction computed by the at least one endpoint device using a second computation algorithm that produces a substantially same result as the first computation algorithm and is performed based on the same historic power usage values of sensor data corresponding to each of the at least one endpoint device.

8. The method of claim 1, wherein the central data collection point computes the predicted power usage values using a first computation algorithm; and further comprising:
   updating, at the central data collection point, the first computation algorithm to a new computation algorithm and transmitting instructions to the at least one endpoint device to apply the new computation algorithm.

9. The method of claim 1, wherein computing the predicted power usage values is performed for a large plurality of endpoint devices within a time window that is smaller than a regular reporting period of any one of the endpoint devices.

10. The method of claim 1, wherein in receiving the exception data, the central data collection point obtains information about the discrepancy only in response to a result of a comparison performed remotely from the central data collection point between predicted power usage values and actual measured power usage values exceeding limits of pre-established comparison criteria.

11. The method of claim 1, wherein in receiving the exception data, the central data collection point obtains information about the discrepancy based on a comparison between predicted power usage values computed by the at least one endpoint device and actual measured power usage values as measured by that at least one endpoint device exceeding limits of pre-established comparison criteria.

12. The method of claim 1, wherein receiving the exception data includes receiving a report containing the one or more actual measured sensor data power usage values based upon which the discrepancy was determined by the at least one endpoint device.

13. The method of claim 1, wherein superseding the at least one of the predicted power usage values includes replacing that at least one predicted value with actual measured sensor data power usage values.

14. The method of claim 1, wherein the sensor data represents utility consumption and further comprising:
   generating, at the central data collection point, a determination of a current system-wide instantaneous consumption based on the actual measured power usage values and on the predicted power usage values for the plurality of endpoint devices.

15. A central data collection point for use in a sensor data collection system for collecting data from a plurality of endpoint devices, comprising:
   a collection engine module configured to receive sensor data generated at each of the plurality of endpoint devices, the sensor data representing a series of actual measured power usage values;
   a database containing records corresponding to the individual endpoint devices and including historic power usage values of sensor data for those endpoint devices;
   a prediction module configured to compute predicted power usage values representing presumed sensor data for at least one endpoint device, wherein the predicted power usage values are computed based on the historic power usage values of sensor data corresponding to the at least one endpoint device;
   a data selector module configured to compare the predicted power usage values and the sensor data to identify exception data and sufficiently accurate data, the exception data representing a discrepancy between at least one of the predicted power usage values and a corresponding at least one actual measured sensor power usage data value;
    wherein the data selector module is further configured such that, in response to receiving the exception data, the data selector module supersedes the at least one of the predicted power usage values based on the exception data by replacing the predicted power usage values with the exception data, and
    wherein the sufficiently accurate data is not sent to the database.

16. The central data collection point of claim 15, wherein the sensor data represents utility consumption.

17. The central data collection point of claim 15, wherein the series of actual measured power usage values of the sensor data is measured at a first time granularity and the predicted power usage values representing the presumed sensor data represent sensor data measured at a second time granularity, the second time granularity being a finer granularity than the first time granularity.

18. The central data collection point of claim 15, wherein the database is configured to store actual measured power usage values of sensor data received from a first endpoint device and predicted power usage values corresponding to the first endpoint device in a common database record associated with the first endpoint device.

19. The central data collection point of claim 15, wherein the prediction module is configured to compute the predicted power usage values in response to a call for instantaneous measurement.

20. The central data collection point of claim 15, wherein the prediction module is configured to compute the predicted power usage values at a condensed time interval that is shorter than a reporting interval at which the sensor data is regularly reported by each of the plurality of endpoint devices.

21. The central data collection point of claim 15, wherein the prediction module is configured to compute the predicted power usage values using a first computation algorithm; and further comprising:
    a re-configuration module configured to update the first computation algorithm to a new computation algorithm and generate instructions to the at least one endpoint device to apply the new computation algorithm.

22. The central data collection point of claim 15, wherein the prediction module is configured to compute the predicted power usage values for a large plurality of endpoint devices within a time window that is smaller than a regular reporting period of any one of the endpoint devices.

23. An endpoint device for use with a sensor data collection system for collecting data from a large plurality of sensors, the endpoint device comprising:
    a sensor data input module configured to obtain actual power usage measurements from a sensor at a relatively fine time granularity;
    a reporting module operatively coupled to the sensor data input module and configured to generate reports for receipt by a central data collection point, the reports including:
        regular reports containing a portion of the actual measurements representing sensor measurements at a relatively coarse time granularity; and
        exception reports, each exception report containing information representing one or more of the actual power usage measurements that differ in time granularity from the coarse granularity of the regular reports, each of the exception reports being generated in response to a determination that at least one of the one or more actual measurements differs from a predicted power usage value for that at least one of the one or more actual power usage measurements by an amount that exceeds a pre-established limit, wherein the exception reports contain actual data that replaces at least one of the predicted power usage values.

24. The endpoint device of claim 23, further comprising:
    a prediction module operatively coupled to the reporting module and configured to compute predicted power usage values representing presumed sensor data at a relatively fine time granularity, the predicted power usage values being computed based on previously-reported actual power usage measurements.

25. The endpoint device of claim 24, wherein the prediction module is configured to compute the predicted power usage values using a computation algorithm that corresponds to a computation algorithm for predicting the same power usage value at the central data collection point.

26. The endpoint device of claim 23, further comprising:
    a comparator module operatively coupled to the sensor data input module and to the reporting module, and configured to compare the at least one of the one or more actual power usage measurements with a predicted power usage value for that at least one actual power usage measurement, and to perform the determination of whether a difference between the at least one actual power usage measurement and predicted power usage value corresponding to that actual power usage measurement exceeds the pre-established limit.

27. The endpoint device of claim 23, further comprising:
    a data store operatively coupled to the sensor data input module and configured to maintain a historical record of at least a portion of the actual power usage measurement data.

28. The endpoint device of claim 27, wherein the data store is configured to store primarily information relating to actual power usage measurement data to be used in computing a next predicted power usage value.

29. The endpoint device of claim 23, further comprising:
    a utility meter interface operatively coupled to the sensor data input and wherein the sensor comprises a utility meter.

30. The endpoint device of claim 23, wherein the reporting module is configured to generate exception reports containing a series of power usage measurements at a time granularity that is finer than the relatively coarse time granularity.

31. A method for operating an endpoint device in a sensor data collection system for collecting data from a large plurality of sensors, the method comprising:
    obtaining actual power usage measurements from a sensor at a relatively fine time granularity; and
    generating reports for receipt by a central data collection point, the reports including:
        regular reports containing a portion of the actual power usage measurements representing sensor measurements at a relatively coarse time granularity; and
        exception reports, each exception report containing information representing one or more of the actual power usage measurements that differ in time granularity from the coarse granularity of the regular reports, each of the exception reports being generated in response to a determination that at least one of the one or more actual power usage measurements differs from a predicted value for that at least one of the one or more actual power usage measurements by an amount that exceeds a pre-established limit, wherein the exception reports contain actual data that replaces at least one of the predicted power usage values.

32. The method of claim 31, further comprising:
computing predicted power usage values representing presumed sensor data at a relatively fine time granularity, the predicted power usage values being computed based on previously-reported actual measurements.

33. The method of claim 32, wherein in computing the predicted power usage values, a computation algorithm that corresponds to a computation algorithm for predicting the same value at the central data collection point is used.

34. The method of claim 31, further comprising:
comparing, by the endpoint device, the at least one of the one or more actual power usage measurements with a predicted value for that at least one actual power usage measurement; and
performing, by the endpoint device, the determination of whether a difference between the at least one actual power usage measurement and predicted power usage value corresponding to that actual power usage measurement exceeds the pre-established limit.

35. The method of claim 31, further comprising:
maintaining a historical record of at least a portion of the actual power usage measurement data.

36. The method of claim 35, wherein in maintaining the historical record, storing primarily information relating to actual power usage measurement data to be used in computing a next predicted power usage value.

37. The method of claim 31, wherein in generating the exception reports, providing in each of the exception reports a series of power usage measurements at a time granularity that is finer than the relatively coarse time granularity.

* * * * *